United States Patent
Kim et al.

(10) Patent No.: US 9,843,025 B2
(45) Date of Patent: Dec. 12, 2017

(54) SECONDARY BATTERY AND METHOD FOR MANUFACTURING THE SAME

(71) Applicant: LG Chem, Ltd., Seoul (KR)

(72) Inventors: Sung-Jong Kim, Daejeon (KR); Cha-Hun Ku, Daejeon (KR)

(73) Assignee: LG Chem, Ltd. (KR)

( * ) Notice: Subject to any disclaimer, the term of this patent is extended or adjusted under 35 U.S.C. 154(b) by 64 days.

(21) Appl. No.: 14/491,023

(22) Filed: Sep. 19, 2014

(65) Prior Publication Data

US 2015/0004446 A1    Jan. 1, 2015

Related U.S. Application Data

(63) Continuation of application No. PCT/KR2014/001232, filed on Feb. 14, 2014.

(30) Foreign Application Priority Data

Feb. 26, 2013    (KR) .................. 10-2013-0020744

(51) Int. Cl.
*H01M 2/08* (2006.01)
*H01M 2/04* (2006.01)
(Continued)

(52) U.S. Cl.
CPC ....... *H01M 2/0456* (2013.01); *H01M 2/0202* (2013.01); *H01M 2/0408* (2013.01);
(Continued)

(58) Field of Classification Search
CPC ...... H01M 2/022; H01M 2/0404; H01M 2/12; H01M 2/263; H01M 10/0436;
(Continued)

(56) References Cited

U.S. PATENT DOCUMENTS 5,626,983 A * 5/1997 Ekern .................. H01M 2/16
429/166
5,896,647 A    4/1999 Shkuratoff
(Continued)

FOREIGN PATENT DOCUMENTS

EP    2133937 A1    12/2009
EP    2333869 A1    6/2011
(Continued)

OTHER PUBLICATIONS

Supplemental Search Report from corresponding European Application No. 14 75 7062, dated Aug. 3, 2015.
(Continued)

*Primary Examiner* — Nicholas P D'Aniello
*Assistant Examiner* — Abibatu O Ojo-Amoo
(74) *Attorney, Agent, or Firm* — Lerner, David, Littenberg, Krumholz & Mentlik, LLP

(57) ABSTRACT

A secondary battery having no beading portion includes an electrode assembly having a cathode plate and an anode plate arranged with a separator being interposed therebetween, a battery case having an upper can configured to accommodate the electrode assembly and an electrolytic solution in an inner space thereof and have an open top and an open bottom, the top of the upper can being bent inwards, and a lower sealing member coupled to the bottom of the upper can to seal the bottom of the upper can, and a cap assembly having a top cap protruding on an uppermost portion thereof to form a cathode terminal, a safety vent located below the top cap and configured to change a shape when an inner pressure of the battery case increases, and a gasket surrounding rims of the top cap and the safety vent.

17 Claims, 6 Drawing Sheets

(51) Int. Cl.
  *H01M 2/12*    (2006.01)
  *H01M 2/34*    (2006.01)
  *H01M 10/058*  (2010.01)
  *H01M 2/02*    (2006.01)
  *H01M 10/052*  (2010.01)

(52) U.S. Cl.
  CPC ........... *H01M 2/08* (2013.01); *H01M 2/1229* (2013.01); *H01M 2/1241* (2013.01); *H01M 2/345* (2013.01); *H01M 2/348* (2013.01); *H01M 10/058* (2013.01); *H01M 2/022* (2013.01); *H01M 2/027* (2013.01); *H01M 10/052* (2013.01); *H01M 2200/106* (2013.01); *Y10T 29/4911* (2015.01)

(58) Field of Classification Search
  CPC .. H01M 10/52; H01M 10/286; H01M 10/445; H01M 10/643; H01M 8/2435; H01M 2200/106; H01M 2/22; H01M 2/0413; H01M 2/0426; H01M 2/0434; Y10T 29/49108
  USPC .......................................................... 429/56
  See application file for complete search history.

(56) References Cited

U.S. PATENT DOCUMENTS

| | | |
|---|---|---|
| 8,252,455 B2 | 8/2012 | Kusama et al. |
| 2003/0091893 A1 | 5/2003 | Kishiyama et al. |
| 2005/0048365 A1 | 3/2005 | Miyahisa et al. |
| 2009/0233160 A1 | 9/2009 | Kim |
| 2009/0311585 A1 | 12/2009 | Muraoka et al. |
| 2010/0040945 A1* | 2/2010 | Wang ............... B23K 26/20 429/164 |
| 2010/0159307 A1* | 6/2010 | Mao ............... H01M 2/1241 429/53 |
| 2011/0027644 A1* | 2/2011 | Kiyama ............ H01M 2/0202 429/181 |
| 2011/0129708 A1 | 6/2011 | Doo |
| 2012/0100404 A1 | 4/2012 | Lee et al. |
| 2012/0202108 A1 | 8/2012 | Kim et al. |
| 2013/0216870 A1 | 8/2013 | Kim et al. |
| 2013/0295442 A1 | 11/2013 | Kim et al. |

FOREIGN PATENT DOCUMENTS

| | | |
|---|---|---|
| JP | 553-041622 A | 4/1978 |
| JP | S54-144222 | 10/1979 |
| JP | 2005100927 A | 4/2005 |
| JP | 2008262832 A | 10/2008 |
| JP | 2009-181776 A | 8/2009 |
| JP | 2013502048 A | 1/2013 |
| KR | 2006-0097481 A | 9/2006 |
| KR | 2009-0089292 A | 8/2009 |
| KR | 2012-0063264 A | 6/2012 |
| WO | 2013-025078 A2 | 2/2013 |

OTHER PUBLICATIONS

Supplemental Partial Search Report from European Application No. 14 75 7062, dated Apr. 1, 2015.
International Search Report for PCT/KR2014/001232 dated May 23, 2014.

* cited by examiner

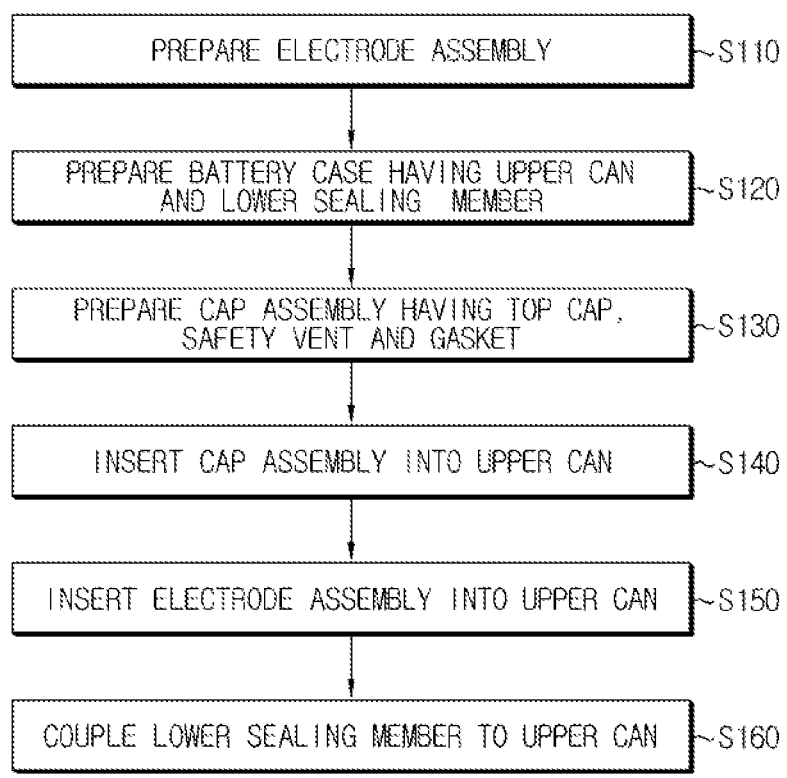

SECONDARY BATTERY AND METHOD FOR MANUFACTURING THE SAME

CROSS-REFERENCE TO RELATED APPLICATION

The present application is a continuation of International Application No. PCT/KR2014/001232 filed on Feb. 14, 2014, which claims priority under 35 USC 119(a) to Korean Patent Application No. 10-2013-0020744 filed on Feb. 26, 2013 in the Republic of Korea, the disclosures of which are incorporated herein by reference.

TECHNICAL FIELD

The present disclosure relates to a technique for manufacturing a secondary battery, and more particularly, to a secondary battery with improved capacity and safety by allowing a cap assembly and a battery case not to be welded to each other without forming a beading portion, and a method for manufacturing the secondary battery.

BACKGROUND ART

Generally, a secondary battery refers to a rechargeable battery, while a primary battery refers to a non-rechargeable battery. Secondary batteries are widely used for electronic devices such as cellular phones, notebook computers, video cameras, electric vehicles, or the like. In particular, a lithium secondary battery has an operating voltage of about 3.6 V, triple the capacity of nickel-cadmium batteries or nickel hydrogen batteries generally used as power sources of electronic devices, and due to its high energy density per unit weight, are being utilized more and more.

The lithium secondary battery generally uses lithium oxide and carbonaceous material as a cathode active material and an anode active material, respectively. The lithium secondary battery includes an electrode assembly in which a cathode plate and an anode plate respectively coated with the cathode active material and the anode active material are disposed with a separator interposed between them, and a battery case (an exterior material) which seals and receives the electrode assembly together with an electrolyte.

Meanwhile, depending on the shape of the battery case, a lithium secondary battery may be classified into a can type secondary battery where the electrode assembly is included in a metal can and a pouch type battery where the electrode assembly is included in a pouch of an aluminum laminate. In addition, depending on the shape of the metal can, the can type secondary battery may be further classified into a cylindrical battery and a rectangular battery. The exterior material of the rectangular or cylindrical secondary battery includes a battery case having an open end and a cap assembly sealably coupled to the open end of the battery case.

FIG. 1 is a cross-sectional view schematically showing a general cylindrical secondary battery having a beading portion formed at a battery case.

Referring to FIG. 1, the cylindrical secondary battery generally includes a cylindrical battery case 20 having a sealed bottom and an open top, a jelly-roll type electrode assembly 30 received in the battery case 20, a cap assembly 10 coupled to the upper portion of the battery case 20, a beading portion 40 provided at the front end of the battery case 20 for mounting the cap assembly 10, and a clamping portion 50 for sealing the battery.

The electrode assembly 30 is generally rolled in a jelly-roll shape in a state where a separator is interposed between a cathode plate and an anode plate. A cathode lead 31 is attached to the cathode plate and connected to the cap assembly 10, and an anode lead 32 is attached to the anode plate and connected to the lower end of the battery case 20.

The cap assembly 10 includes a top cap 11 forming a cathode terminal, a safety vent 12 for interrupting a current and/or for exhausting gas when the pressure in the battery increases, an insulation member 13 for electrically separating the safety vent 12 except for a specific portion from a current interrupt member 14, and a current interrupt member 14 connected to a cathode lead 31 connected to the cathode plate, which are laminated in the above order. In addition, the cap assembly 10 is mounted to the beading portion 40 of the battery case 20 in a state of being mounted to a gasket 15. Therefore, in a normal operating condition, the cathode of the electrode assembly 30 is electrically connected to the top cap 11 via the cathode lead 31, the current interrupt member 14 and the safety vent 12.

However, in the general secondary battery having a beading portion as described above, the beading portion 40 should be formed at the battery case 20 in order to couple and fix the cap assembly 10. However, since the accommodation capacity of the electrode assembly 30 decreases as much as the area occupied by the beading portion 40, the battery capacity also decreases. Therefore, in order to solve this problem, a secondary battery having no beading portion 40 formed at the battery case 20 has been recently proposed.

FIG. 2 is a cross-sectional view schematically showing a general cylindrical secondary battery having no beading portion formed at the battery case 20.

Referring to FIG. 2, a beading portion is not formed at the battery case 20. In addition, the cap assembly 10 is coupled to the top of the battery case 20 by means of laser welding or the like, as indicated by L, to seal the battery case 20. At this time, in order to weld the cap assembly 10 to the battery case 20, a cover 16 is generally provided at the outermost portion of the cap assembly 10 as shown in FIG. 2. Since the cover 16 is to be welded to the battery case 20, the cover 16 may be made of a material which can be welded to the battery case 20, for example a metallic material.

In the general secondary battery having no beading portion, a process for welding the cap assembly 10 to the battery case 20 is performed. However, in the welding process, welding segments may be generated, and these welding segments may be adhered to the cap assembly 10 or the electrode assembly 30 and cause an electric short in the battery.

In addition, when the cap assembly 10 is welded to the battery case 20, heat may be generated, and the generated heat may damage various components of the cap assembly 10. Moreover, since the cover 16 made of metal or the like to be welded to the battery case 20 should be separately prepared at the cap assembly 10, the structure of the cap assembly 10 becomes more complicated and increases in manufacturing costs, causing the secondary battery to have a greater weight.

DISCLOSURE

Technical Problem

The present disclosure is designed to solve the problems of the related art, and therefore the present disclosure is directed to providing a secondary battery, which may have improved capacity since a beading portion is not formed at a battery case, and may also improve productivity and prevent a cap assembly from being shorted or damaged by welding segments since the cap assembly is not welded to the battery case. The present disclosure is also directed to providing a method for manufacturing the secondary battery.

Other objects and advantages of the present disclosure will be understood from the following descriptions and become apparent by the embodiments of the present disclosure. In addition, it is understood that the objects and advantages of the present disclosure may be implemented by components defined in the appended claims or their combinations.

Technical Solution

In one aspect of the present disclosure, there is provided a secondary battery having no beading portion, which includes an electrode assembly having a cathode plate and an anode plate arranged with a separator being interposed therebetween; a battery case having an upper can configured to accommodate the electrode assembly and an electrolytic solution in an inner space thereof and have an open top and an open bottom, the top of the upper can being bent inwards, and a lower sealing member coupled to the bottom of the upper can to seal the bottom of the upper can; and a cap assembly having a top cap protruding on an uppermost portion thereof to form a cathode terminal, a safety vent located below the top cap and configured to change a shape when an inner pressure of the battery case increases, and a gasket surrounding rims of the top cap and the safety vent.

Preferably, the gasket may have an upper end contacting an inner surface of the bent top of the upper can and a lower end contacting an upper surface of the electrode assembly.

Also preferably, the secondary battery may further include an upper insulation plate provided at an upper portion of the electrode assembly, and the gasket may have an upper end contacting an inner surface of the bent top of the upper can and a lower end contacting an upper surface of the upper insulation plate.

Also preferably, the upper can and the lower sealing member may be coupled by means of laser welding.

Also preferably, the lower sealing member may have a groove, and the upper can may be inserted into the groove of the lower sealing member.

In another aspect, there is also provided a battery pack, which includes the secondary battery described above.

In still another aspect, there is also provided a method for manufacturing a secondary battery having no bent portion, which includes preparing an electrode assembly having a cathode plate and an anode plate arranged with a separator being interposed therebetween; preparing a battery case having an upper can configured to accommodate the electrode assembly and an electrolytic solution in an inner space thereof and have an open top and an open bottom, the top of the upper can being bent inwards, and a lower sealing member separated from the upper can; preparing a cap assembly having a top cap protruding on an uppermost portion thereof to form a cathode terminal, a safety vent located below the top cap and configured to deform a shape when an inner pressure of the battery case increases, and a gasket surrounding rims of the top cap and the safety vent; inserting the cap assembly upwards through the bottom opening of the upper can so that an upper end of the gasket contacts an inner surface of the bent top of the upper can; inserting the electrode assembly upwards through the bottom opening of the upper can to be located below the cap assembly; and coupling the lower sealing member to the bottom of the upper can to seal the bottom of the upper can.

Preferably, in the process of inserting the electrode assembly, the electrode assembly may be inserted so that an upper surface of the electrode assembly contacts a lower end of the gasket.

Also preferably, in the process of preparing the electrode assembly, an upper insulation plate may be further provided at an upper portion of the electrode assembly and in the process of inserting the electrode assembly, the electrode assembly may be inserted so that an upper surface of the upper insulation plate contacts a lower end of the gasket.

Also preferably, in the process of coupling the lower sealing member to the bottom of the upper can, the lower sealing member may be coupled to the bottom of the upper can by means of laser welding.

Also preferably, in the process of coupling the lower sealing member to the bottom of the upper can, the upper can may be inserted into a groove of the lower sealing member.

Advantageous Effects

According to an embodiment of the present disclosure, since a beading portion is not formed at the battery case, the accommodation space of the electrode assembly increases, which may improve the capacity of the secondary battery.

In addition, according to an embodiment of the present disclosure, since the battery case is not welded to a cap assembly, it is possible to prevent a short from being generated in the secondary battery due to welding segments generated during a welding process. Moreover, it is also possible to prevent heat generated during the welding process from being transferred to the cap assembly and damaging the cap assembly.

Further, according to an embodiment of the present disclosure, since there is no need to separately provide a cover to be welded to the battery case at the cap assembly, it is possible to prevent the cap assembly from having a complicated structure to reduce manufacturing costs and time.

Therefore, according to the present disclosure, productivity and quality of the secondary battery may be improved, and the secondary battery may also be easily designed to have lightweight.

DESCRIPTION OF DRAWINGS

The accompanying drawings illustrate preferred embodiments of the present disclosure and, together with the foregoing disclosure, serve to provide further understanding of the technical spirit of the present disclosure. However, the present disclosure is not to be construed as being limited to the drawings. In the drawings:

FIG. 8 is a schematic flowchart for illustrating a method for manufacturing a secondary battery having no beading portion formed according to an embodiment of the present disclosure.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the description proposed herein is just a preferable example for the purpose of illustrations only, not intended to limit the scope of the disclosure, so it should be understood that other equivalents and modifications could be made thereto without departing from the spirit and scope of the disclosure.

Figure 1:
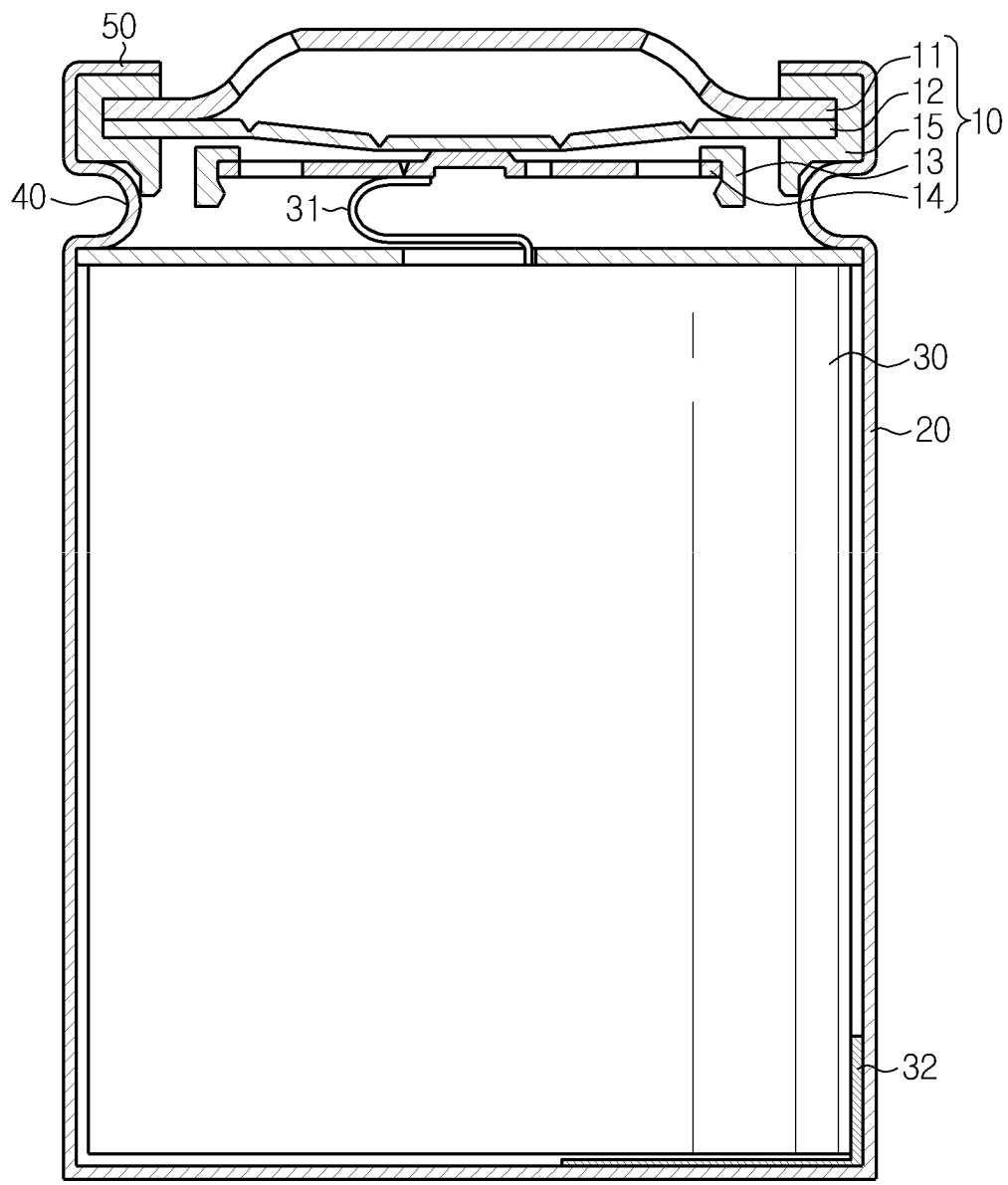
FIG. 1 is a cross-sectional view schematically showing a general cylindrical secondary battery having a beading portion formed at a battery case.
Figure 2:
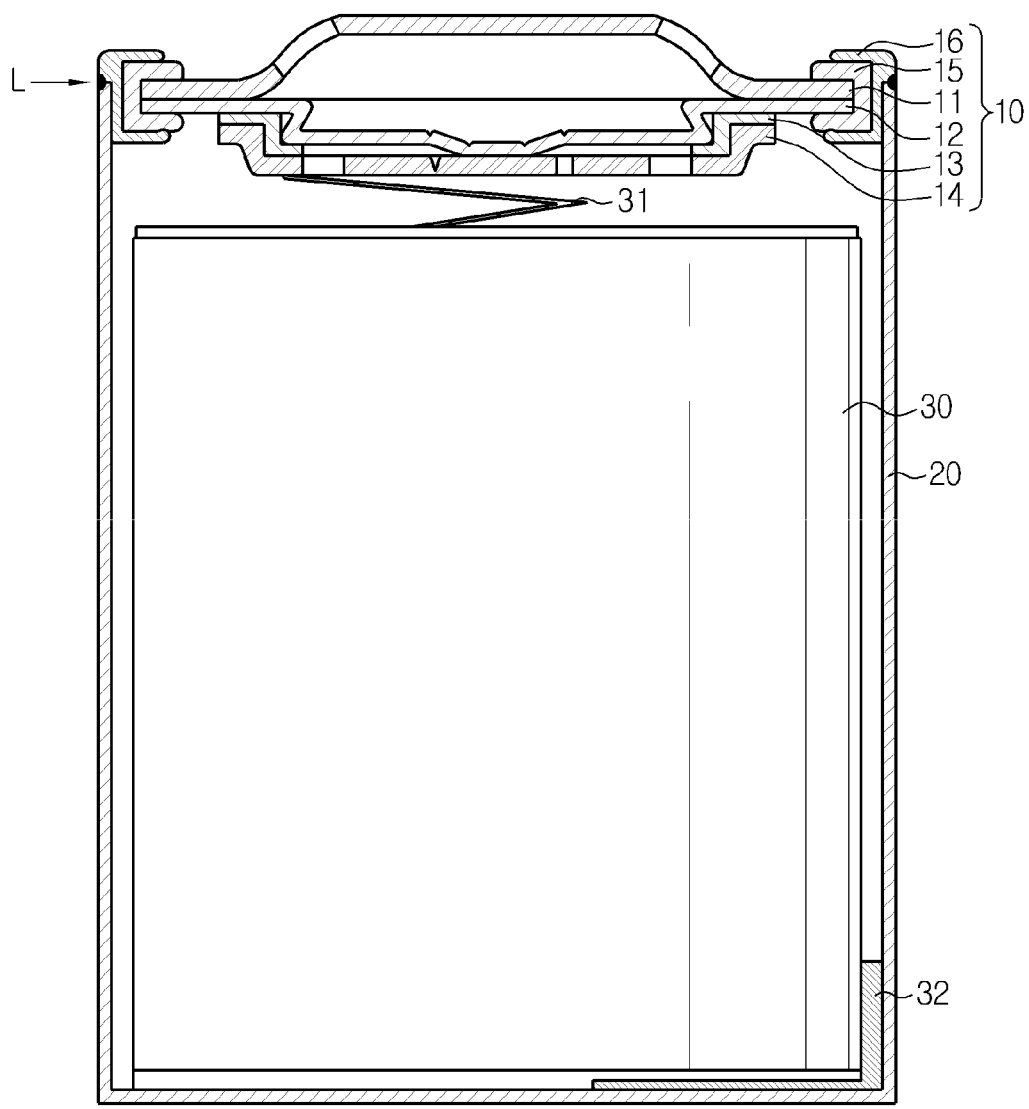
FIG. 2 is a cross-sectional view schematically showing a general cylindrical secondary battery having no beading portion formed at a battery case.
Figure 3:
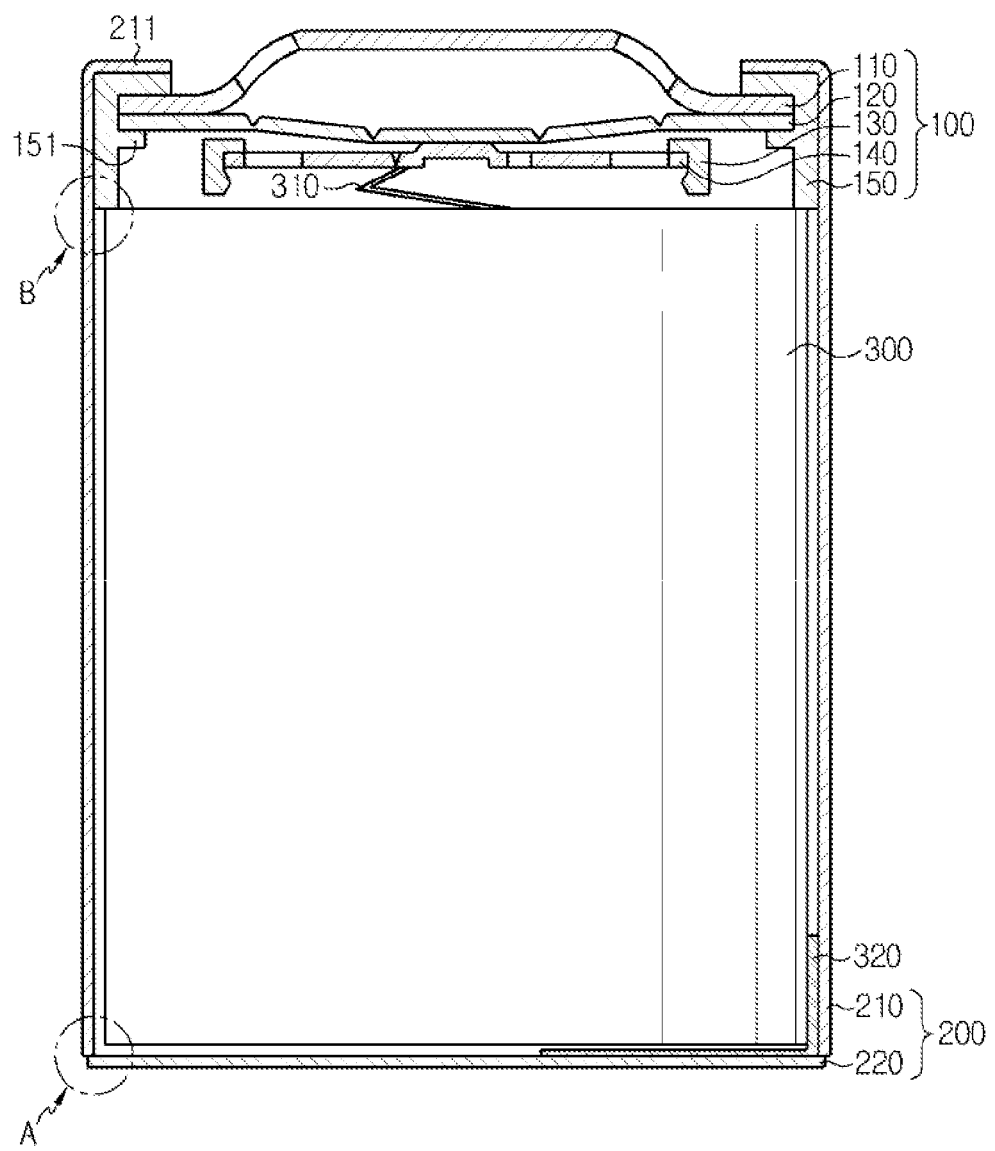
FIG. 3 is a cross-sectional view schematically showing a secondary battery according to an embodiment of the present disclosure.

FIG. 3 is a cross-sectional view schematically showing a secondary battery according to an embodiment of the present disclosure.

Referring to FIG. 3, a secondary battery according to the present disclosure includes an electrode assembly 300, a battery case 200 and a cap assembly 100.

The electrode assembly 300 may be configured to have a cathode plate and an anode plate arranged so that a separator is interposed between them, and the electrode assembly 300 is accommodated in the battery case 200. At this time, the electrode assembly 300 may be rolled in a jelly-roll shape, and in this case, the electrode assembly 300 is also called a jelly roll. Electrode plates of the electrode assembly 300 are formed by coating a current collector with active material slurry, and the slurry may be generally formed by stirring active material, auxiliary conductor, binder and plasticizer in a granular form together with a solvent. A start tip and an end tip of the current corrector in the rolling direction of the electrode plates may have non-coating portions to which the slurry is not applied, and electrode leads corresponding to the electrode plates may be respectively attached to the non-coating portions. Generally, the cathode lead 310 is attached to the upper end of the electrode assembly 300 and electrically connected to the cap assembly 100, and the anode lead 320 is attached to the lower end of the electrode assembly 300 and connected to the bottom of the battery case 200.

The battery case 200 may be made of lightweight conductive metal material such as aluminum, stainless steel or their alloys, and has an inner space to accommodate the electrode assembly 300 and an electrolytic solution.

In particular, the battery case 200 of the present disclosure may include an upper can 210 and a lower sealing member 220.

Here, the upper can 210 occupies most of the battery case 200 and configures an upper portion and a side portion of the battery case 200, and the upper can 210 gives the inner space to accommodate the electrode assembly 300 and the electrolytic solution.

In addition, the upper can 210 has an open top and an open bottom. Therefore, the upper portion of the cap assembly 100 exposes out of the secondary battery through the top opening of the upper can 210 and may electrically connect to an external device. In particular, the top opening of the upper can 210 is sized so that the cap assembly 100 and the electrode assembly 300 are not able to pass through, but the bottom opening of the upper can 210 is sized so that the cap assembly 100 and the electrode assembly 300 are able to pass through. Therefore, the cap assembly 100 and the electrode assembly 300 may be inserted into the battery case 200 through the bottom opening of the upper can 210.

At this time, the top of the upper can 210 may be bent inwards. In other words, the upper can 210 may have a bent portion 211 at its top. The bent top 211 may prevent the cap assembly 100 from deviating upwards from the upper can 210. In particular, the bent top 211 of the upper can 210 is not formed after the electrode assembly 300 and the cap assembly 100 are inserted into the battery case 200 but formed in advance before the electrode assembly 300 and the cap assembly 100 are inserted, different from a clamping portion of a general secondary battery. Therefore, even though the electrode assembly 300 or the cap assembly 100 has been damaged during an existing clamping process for forming a clamping portion, this problem does not occur in the present disclosure.

Preferably, the upper can 210 may have a cylindrical shape. Therefore, the secondary battery according to the present disclosure may be applied to a cylindrical secondary battery. However, the present disclosure is not limited to a specific shape of the upper can 210, and the upper can 210 may have any shape other than the cylindrical shape, for example a rectangular shape.

The lower sealing member 220 is coupled to the bottom of the upper can 210 to seal the bottom of the battery case 200. In other words, in the secondary battery according to the present disclosure, the bottom of the upper can 210 is open, and the lower sealing member 220 is coupled to the bottom of the upper can 210 to close the bottom opening. Therefore, the lower sealing member 220 may prevent the electrode assembly 300) and the electrolytic solution accommodated in the upper can 210 from leaking through the bottom of the upper can 210.

The lower sealing member 220 is coupled to the upper can 210 after the cap assembly 100 and the electrode assembly 300 are inserted into the inner space of the upper can 210 through the bottom opening. Here, the electrolytic solution may be injected through the bottom of the upper can 210 after the cap assembly 100 and the electrode assembly 300 are inserted and before the lower sealing member 220 is coupled to the upper can 210. However, the electrolytic solution may also be inserted into the upper can 210 through the cap assembly 100 after the lower sealing member 220 is coupled to the upper can 210.

Preferably, the upper can 210 and the lower sealing member 220 are coupled to each other by means of laser welding.

Figure 4:
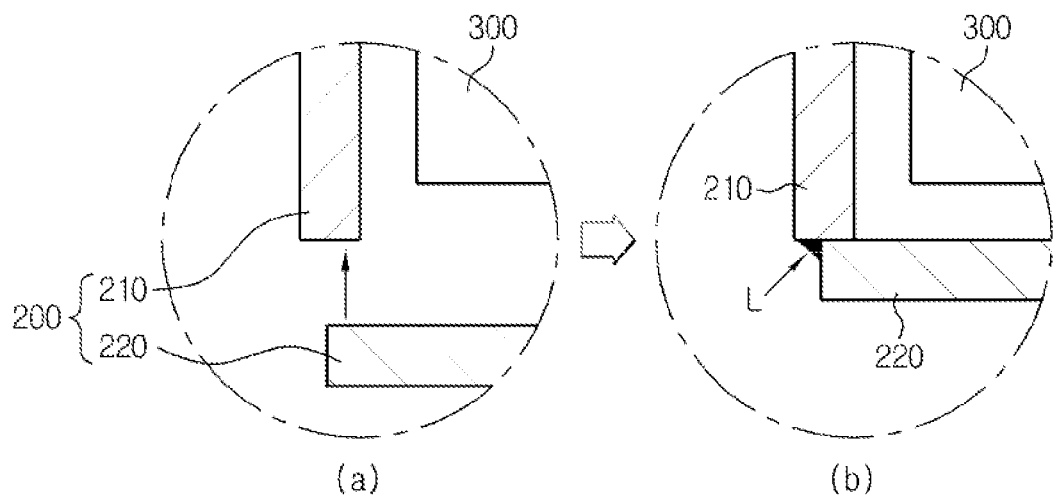
FIG. 4 is a schematic diagram showing a coupling configuration of an upper can and a lower sealing member according to an embodiment of the present disclosure.

FIG. 4 is a schematic diagram showing a coupling configuration of the upper can 210 and the lower sealing member 220 according to an embodiment of the present disclosure. In FIG. 4, the A portion of FIG. 3 is depicted as an enlarged view for convenience.

First, as shown in the (a) portion of FIG. 4, the bottom of the upper can 210 is open, and the lower sealing member 220 moves to the bottom of the upper can 210 after the electrode assembly 300 is inserted. In addition, if the lower sealing member 220 is closely adhered to the bottom of the upper can 210, as indicated by L in the (b) portion of FIG. 4, the bottom of the upper can 210 and the lower sealing member 220 are coupled to each other by means of an adhering manner such as laser welding to seal the coupled portion.

Even though FIG. 4 shows a left lower portion of the battery case 200 of FIG. 3, this coupling configuration may be applied to the entire lower portion of the battery case.

Meanwhile, the coupling configuration of the upper can 210 and the lower sealing member 220 as shown in FIG. 4 is just an example, and the present disclosure is not limited thereto. In other words, various coupling configurations may be applied.

Preferably, a groove may be formed in the lower sealing member 220, and the upper can 210 may be inserted into the groove of the lower sealing member 220 so that the upper can 210 and the lower sealing member 220 are coupled to each other.

Figure 5:
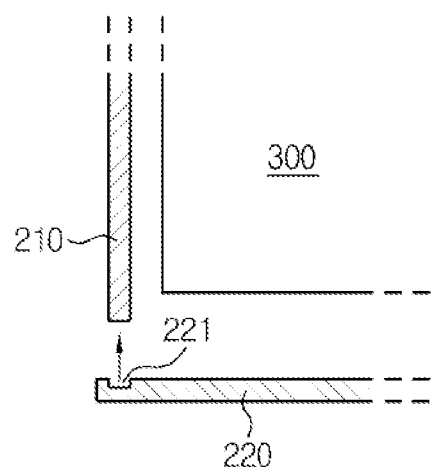
FIGS. 5 and 6 are schematic diagrams showing a coupling configuration of an upper can and a lower sealing member according to another embodiment of the present disclosure.
Figure 6:
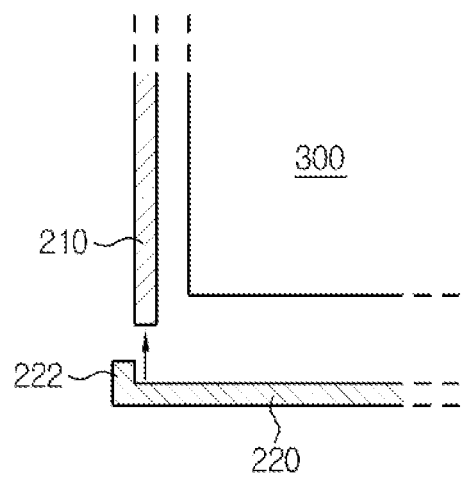

FIGS. 5 and 6 are schematic diagrams showing coupling configurations of the upper can 210 and the lower sealing member 220 according to another embodiment of the present disclosure. In FIGS. 5 and 6, the A portion of FIG. 3 is also depicted as an enlarged view for convenience.

First, as shown in FIG. 5, the lower sealing member 220 may have a groove 221, namely a concave portion, formed in its upper portion. The groove 221 may be formed to have a shape corresponding to the bottom of the upper can 210. Therefore, when the lower sealing member 220 moves to be closely adhered to the bottom of the upper can 210 as indicated by an arrow in FIG. 5, the bottom of the upper can 210 may be inserted into the groove 221.

However, the groove 221 of the lower sealing member 220 may be modified in various ways. For example, as shown in FIG. 6, a protrusion 222 may be provided at an outer circumference of the upper end of the lower sealing member 220. In this case, the inner side of the protrusion 222 forms a concave portion and thus serves as a groove. Therefore, when the lower sealing member 220 moves to be closely adhered to the bottom of the upper can 210 as indicated by an arrow in FIG. 6, the bottom of the upper can 210 may be located in the groove, namely at the inner side of the protrusion 222.

In particular, in the above embodiments, it is possible to prevent the upper can 210 and the lower sealing member 220 from shaking in a lateral direction, which improves the coupling force between the upper can 210 and the lower sealing member 220.

Meanwhile, even in the embodiments in which the upper can 210 is inserted into the groove of the lower sealing member 220 as shown in FIGS. 5 and 6, the upper can 210 and the lower sealing member 220 may be coupled to each other by means of laser welding.

Figure 7:
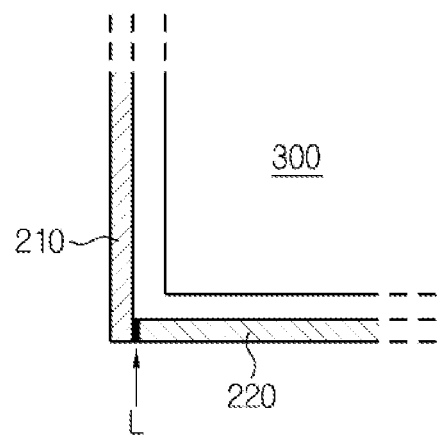
FIG. 7 is a schematic diagram showing a coupling configuration of an upper can and a lower sealing member according to another embodiment of the present disclosure.

FIG. 7 is a schematic diagram showing a coupling configuration of the upper can 210 and the lower sealing member 220 according to another embodiment of the present disclosure.

As shown in FIG. 7, the lower sealing member 220 may be inserted into an inner surface of the bottom of the upper can 210. In addition, the lower sealing member 220 and the upper can 210 may be coupled to each other by means of laser welding as indicated by L.

In addition to the embodiments of FIGS. 4 to 7, the coupling configuration of the upper can 210 and the lower sealing member 220 may be modified in various ways.

The cap assembly 100 includes a top cap 110, a safety vent 120 and a gasket 150. In addition, the cap assembly 100 may have various shapes such as a cylindrical shape or a rectangular shape according to the shape of the battery case 200.

The top cap 110 is disposed to protrude upwards at the uppermost portion of the cap assembly 100, thereby forming a cathode terminal. Therefore, the top cap 110 allows the secondary battery to be electrically connected to the outside. In addition, a gas hole for discharging gas may be formed in the top cap 110. Therefore, when gas is generated from the electrode assembly 300, the gas may discharge out of the battery case 200 through the gas hole. The top cap 110 may be made of, for example, metallic material such as stainless steel or aluminum.

The safety vent 120 may be disposed to contact an outer circumference of the top cap 110, namely a rim thereof, below the top cap 110, as shown in the figures. In addition, the safety vent 120 is configured to deform its shape when an inner pressure of the secondary battery, namely an inner pressure of the battery case 200, varies over a predetermined level. For example, the safety vent 120 may be configured to deform its shape and ruptures when the inner pressure of the secondary battery is 12 to 25 kgf/cm$^2$.

For this, the safety vent 120 may be configured so that its center portion protrudes downwards and notches are formed near the center portion, as shown in the figures. Therefore, if gas is generated from the inside of the secondary battery, namely from the electrode assembly 300, to increase the inner pressure, the safety vent 120 may deform its shape to convexly protrude upwards and rupture at the notches. Therefore, the gas filled in the battery case 200 may discharge out through the ruptured portion of the safety vent 120.

The gasket 150 is configured to surround rims of the top cap 110 and the safety vent 120. In particular, the gasket 150 may be interposed between the upper can 210 and the rims of the top cap 110 and the safety vent 120, as shown in FIG. 3. The gasket 150 allows the rims of the top cap 110 and safety vent 120 to be insulated from the upper can 210 and thus is made of a material with electric insulation. In addition, the gasket 150 may be made of a material with elasticity and endurance in order to support and protect the cap assembly 100. Therefore, the gasket 150 may be made of, for example, polyolefin or polypropylene (PP). In addition, the gasket 150 may be bent by means of mechanical processing without using thermal treatment in order to prevent its electric insulation from deteriorating.

In particular, a protrusion 151 may be formed at the gasket 150 to support a lower end of the rim of the safety vent 120 upwards. The protrusion 151 of the gasket 15) may prevent the safety vent 120 and the top cap 110 from deviating downwards.

However, it is also possible that the gasket 150 does not have such a protrusion 151, and in this case, the gasket 150 may support the top cap 110 and the safety vent 120 upwards by using a bent portion or the like.

Preferably, as shown by the B portion of FIG. 3, the gasket 150 may be configured so that its lower end contacts the upper surface of the electrode assembly 300. In addition, the gasket 150 may also be configured so that its upper end contacts the inner surface of the bent top 211 of the upper can 210. In this embodiment, the gasket 150 may prevent the electrode assembly 300 from shaking in the battery case 200, and particularly prevent the electrode assembly 300 from shaking in a vertical direction.

Also preferably, the secondary battery according to the present disclosure may further include an upper insulation plate provided at the upper portion of the electrode assembly 300. The upper insulation plate may be made of a material with electric insulation to insulate the electrode assembly 300 from the cap assembly 100.

In this case, the gasket 150 may be configured so that its lower end contacts the upper surface of the upper insulation plate. In addition, since the upper end of the gasket 150 contacts the inner surface of the bent top 211 of the upper can 210, the gasket 150 may prevent the electrode assembly 300 from shaking.

Also preferably, the cap assembly 100 of the secondary battery according to the present disclosure may further include a current interruptive member 140, as shown in FIG. 3.

The current interruptive member 140 is also called a current interrupt device (CID) and is located between the safety vent 120 and the electrode assembly 300) to electrically connect the electrode assembly 300 to the safety vent 120. In other words, at least a part of the upper portion of the current interruptive member 140 is connected to the lower end of the central protrusion of the safety vent 120, and the lower portion thereof is connected to an electrode lead of the electrode assembly 300, for example a cathode lead 310. Therefore, in a normal state, a current generated from the electrode assembly 300 flows via the cathode lead 310 to the current interruptive member 140, the safety vent 120 and the top cap 110 to discharge the secondary battery. However, if the inner pressure of the battery increases due to the generation of gas to deform the safety vent 120 into an upwardly convex shape, a contact between the safety vent 120 and the current interruptive member 140 is cut, or the current interruptive member 140 ruptures, thereby interrupting the electric connection between the safety vent 120 and the current interruptive member 140.

As described above, the cap assembly 100 may include the current interruptive member 140, and in this case, as shown in FIG. 3, the cap assembly 100 may also further include an insulation member 130.

The insulation member 130 is interposed between the safety vent 120 and the current interruptive member 140 to electrically insulate the current interruptive member 140 and the safety vent 120, except for the central protrusion of the safety vent 120 and the contact portion of the current interruptive member 140.

Meanwhile, the configuration of the cap assembly 100 as shown in FIG. 3 is just an example, and the present disclosure is not limited to such a specific shape of the cap assembly 100.

For example, the cap assembly 100 of the secondary battery according to the present disclosure may further include a safety element (not shown).

The safety element is disposed between the top cap 110 and the safety vent 120 to electrically connect the top cap 110 to the safety vent 120. The safety element may interrupt a current flow in the battery when the temperature of the secondary battery rises, and may be configured with a so-called positive temperature coefficient (PTC) element.

A battery pack according to the present disclosure includes at least one secondary battery described above. In addition, the battery pack may include a battery management device such as a battery management system (BMS) in order to control a charging/discharging operation, in addition to the above secondary battery.

FIG. 8 is a schematic flowchart for illustrating a method for manufacturing a secondary battery having no beading portion formed according to an embodiment of the present disclosure.

Referring to FIG. 8, in order to manufacture a secondary battery according to the present disclosure, first, an electrode assembly 300 having a cathode plate and an anode plate with a separator being interposed between them is prepared (S110). Then, a battery case 200 having an upper can 210 and a lower sealing member 220 is prepared (S120). In addition, a cap assembly 100 having a top cap 110, a safety vent 120 and a gasket 150 is also prepared (S130).

Here, in the battery case 200 prepared in Step S120, the upper can 210 has an inner space to accommodate the electrode assembly 300 and the electrolytic solution and also has an open top and an open bottom. In particular, the top of the upper can 210 is bent inwards. In addition, in Step S120, the lower sealing member 220 of the battery case 200 is provided separately from the upper can 210. Therefore, the bottom of the upper can 210 is in an open state. Meanwhile, the upper can 210 may have a cylindrical shape, but the present disclosure is not limited to such a shape of the upper can 210.

In addition, in the cap assembly 100 prepared in Step S130, the top cap 110 is disposed to protrude at the uppermost portion of the secondary battery to form a cathode terminal, the safety vent 120 is located below the top cap 110 and deforms its shape 110 when the inner pressure of the battery case 200 increases, and the gasket 150 is configured to surround rims of the top cap 110 and the safety vent 120.

Meanwhile, even though FIG. 8 shows that Steps S110, S120 and S130 are performed in order, this is just for convenience of explanation, and Steps S110, S120 and S130 may be in a reverse order or simultaneously.

If the electrode assembly 300, the battery case 200 and the cap assembly 100 are prepared as described above, the cap assembly 100 is inserted through the bottom opening of the upper can 210 so that the upper end of the gasket 150 contacts the inner surface of the bent upper portion of the upper can 210 (S140).

In addition, the electrode assembly 300 is inserted upwards into the upper can 210 through the bottom opening of the upper can 210 to be located in a lower portion of the cap assembly 100 (S150).

After that, the sealing member 220 is coupled to the bottom of the upper can 210 to seal the bottom opening of the upper can 210 (S160).

Preferably, in Step S150, as shown in the portion B of FIG. 3, the electrode assembly 300 may be inserted so that the upper surface of the electrode assembly 300 contacts the lower end of the gasket 150.

In addition, in Step S110, an upper insulation plate may be further provided at the upper portion of the electrode assembly 300. In this case, in Step S150, the electrode assembly 300 may be inserted so that the upper surface of the upper insulation plate contacts the lower end of the gasket 150.

Also preferably, in Step S160, the lower sealing member 220 may be coupled to the bottom of the upper can 210 by means of laser welding.

In addition, in Step S160, the upper can 210 may also be inserted into a groove of the lower sealing member 220. For this, in Step S120, the battery case 200 may be prepared to have a groove formed in the lower sealing member 220 so that the bottom of the upper can 210 may be inserted into the groove.

Also preferably, in Step S130, a current interruptive member 140 having an upper portion connected to the lower end of the safety vent 120 and a lower portion connectable to the electrode assembly 300 and an insulation member 130 interposed between the safety vent 120 and the current interruptive member 140 to electrically insulate the current interruptive member 140, except for a part thereof, from the safety vent 120 may be further provided at the cap assembly 100.

In addition, in Step S130, a safety element disposed between the top cap 110 and the safety vent 120 to interrupt a current when temperature rises may be further provided at the cap assembly 100.

The present disclosure has been described in detail. However, it should be understood that the detailed description and specific examples, while indicating preferred embodiments of the disclosure, are given by way of illustration only, since various changes and modifications within the spirit and scope of the disclosure will become apparent to those skilled in the art from this detailed description.

In addition, even though terms representing directions such as proximal, distal, upper, lower, right, left or the like have been used in the specification, the terms are just used to indicate relative locations for convenience and can be replaced with other words according to an observation point of an observer or an arrangement of a component, as obvious to those having ordinary skill in the art.

What is claimed is:

1. A secondary battery, the secondary battery comprising:
    an electrode assembly having a cathode plate and an anode plate arranged with a separator being interposed therebetween;
    a battery case having an upper can and a lower sealing member, the upper can being a single, continuous piece defining an inner space encompassing substantially all of the electrode assembly and an electrolytic solution, the upper can having an open top and an open bottom, the top of the upper can being bent inwards, and the lower sealing member coupled to the bottom of the upper can to seal the bottom of the upper can; and
    a cap assembly having a top cap protruding on an uppermost portion thereof to form a cathode, a safety vent located below the top cap and configured to change a shape when an inner pressure of the battery case increases, and a gasket surrounding rims of the top cap and the safety vent, the gasket having a protrusion supporting a lower end of the rim of the safety vent upwards,
    wherein the open top of the upper can is sized so that the cap assembly and the electrode assembly are not able to pass through, but the open bottom of the upper can is sized so that the cap assembly and the electrode assembly are able to pass through, and
    wherein the battery case does not include a beading portion and the cap assembly is not welded to the battery case.

2. The secondary battery according to claim 1,
    wherein the upper can and the lower sealing member are coupled by means of laser welding.

3. The secondary battery according to claim 1,
    wherein the lower sealing member has a groove, and the upper can is inserted into the groove of the lower sealing member.

4. The secondary battery according to claim 1, further comprising:
    a current interruptive member having an upper portion connected to a lower end of the safety vent and a lower portion connectable to the electrode assembly; and
    an insulation member interposed between the safety vent and the current interruptive member to electrically insulate the current interruptive member except for a part thereof from the safety vent.

5. The secondary battery according to claim 1, further comprising a safety element disposed between the top cap and the safety vent to interrupt a current when temperature rises.

6. The secondary battery according to claim 1,
    wherein the upper can has a cylindrical shape.

7. A battery pack, which comprises the secondary battery defined in claim 1.

8. A method for manufacturing a secondary battery, the method comprising:
    preparing an electrode assembly having a cathode plate and an anode plate arranged with a separator being interposed therebetween;
    preparing a battery case having an upper can and a lower sealing member, the upper can being a single, continuous piece defining an inner space encompassing substantially all of the electrode assembly and an electrolytic solution, the upper can having an open top and an open bottom, the top of the upper can being bent inwards, and the lower sealing member separated from the upper can;
    preparing a cap assembly having a top cap protruding on an uppermost portion thereof to form a cathode terminal, a safety vent located below the top cap and configured to deform a shape when an inner pressure of the battery case increases, and a gasket surrounding rims of the top cap and the safety vent, the gasket having a protrusion supporting a lower end of the rim of the safety vent upwards, wherein, the open top of the upper can is sized so that the cap assembly and the electrode assembly are not able to pass through, but the open bottom of the upper can is sized so that the cap assembly and the electrode assembly are able to pass through;
    inserting the cap assembly upwards through the bottom opening of the upper can so that an upper end of the gasket contacts an inner surface of the bent top of the upper can;
    inserting the electrode assembly upwards through the bottom opening of the upper can and into the inner space of the upper can to be located below the cap assembly; and
    coupling the lower sealing member to the bottom of the upper can to seal the bottom of the upper can,
    wherein the battery case does not include a beading portion and the cap assembly is not welded to the battery case.

9. The method for manufacturing a secondary battery according to claim 8,
    wherein, in the process of coupling the lower sealing member to the bottom of the upper can, the lower sealing member is coupled to the bottom of the upper can by means of laser welding.

10. The method for manufacturing a secondary battery according to claim 8,
    wherein, in the process of coupling the lower sealing member to the bottom of the upper can, the upper can is inserted into a groove of the lower sealing member.

11. The method for manufacturing a secondary battery according to claim 8,
    wherein, in the process of preparing the cap assembly, the cap assembly further includes a current interruptive member having an upper portion connected to a lower end of the safety vent and a lower portion connectable to the electrode assembly, and an insulation member interposed between the safety vent and the current interruptive member to electrically insulate the current interruptive member except for a part thereof from the safety vent.

12. The method for manufacturing a secondary battery according to claim 8,
wherein, in the process of preparing the cap assembly, the cap assembly further includes a safety element disposed between the top cap and the safety vent to interrupt a current when temperature rises.

13. The method for manufacturing a secondary battery according to claim 8,
wherein the upper can has a cylindrical shape.

14. The secondary battery according to claim 1,
wherein the gasket has an upper end contacting an inner surface of the bent top of the upper can and a lower end contacting an upper surface of the electrode assembly.

15. The secondary battery according to claim 1, further comprising an upper insulation plate provided at an upper portion of the electrode assembly,
wherein the gasket has an upper end contacting an inner surface of the bent top of the upper can and a lower end contacting an upper surface of the upper insulation plate.

16. The method for manufacturing a secondary battery according to claim 8,
wherein, in the process of inserting the electrode assembly, the electrode assembly is inserted so that an upper surface of the electrode assembly contacts a lower end of the gasket.

17. The method for manufacturing a secondary battery according to claim 8,
wherein, in the process of preparing the electrode assembly, an upper insulation plate is further provided at an upper portion of the electrode assembly, and
wherein, in the process of inserting the electrode assembly, the electrode assembly is inserted so that an upper surface of the upper insulation plate contacts a lower end of the gasket.

\* \* \* \* \*